(12) United States Patent
Roy (10) Patent No.: US 11,402,072 B2
(45) Date of Patent: Aug. 2, 2022

(54) ELECTRONIC SAFETY SWITCH FOR LED TUBE

(71) Applicant: SILICON HILL B.V., Amsterdam (NL)

(72) Inventor: Shounak Roy, Maarssenbroek (NL)

(73) Assignee: Silicon Hill B.V., Amsterdam (NL)

( * ) Notice: Subject to any disclaimer, the term of this patent is extended or adjusted under 35 U.S.C. 154(b) by 0 days.

(21) Appl. No.: 17/070,958

(22) Filed: Oct. 15, 2020

(65) Prior Publication Data

US 2021/0108766 A1 Apr. 15, 2021

(30) Foreign Application Priority Data

Oct. 15, 2019 (EP) ..................................... 19203402

(51) Int. Cl.
| | |
|---|---|
| *F21K 9/272* | (2016.01) |
| *F21K 9/275* | (2016.01) |
| *H05B 45/37* | (2020.01) |
| *F21V 25/04* | (2006.01) |

(52) U.S. Cl.
CPC ............... *F21K 9/272* (2016.08); *F21K 9/275* (2016.08); *F21V 25/04* (2013.01); *H05B 45/37* (2020.01)

(58) Field of Classification Search
CPC .......... F21K 9/272; F21K 9/275; F21V 25/04; H05B 45/37
See application file for complete search history.

(56) References Cited

U.S. PATENT DOCUMENTS

| | | |
|---|---|---|
| 9,125,277 B2 | 9/2015 | Reiser |
| 9,277,604 B2 | 3/2016 | Hsia et al. |
| 9,480,123 B2 | 10/2016 | Van Dijk et al. |
| 9,794,990 B2 | 10/2017 | Ye et al. |
| 9,622,317 B2 | 11/2017 | Ackermann et al. |

(Continued)

FOREIGN PATENT DOCUMENTS

| | | |
|---|---|---|
| CN | 106499973 A1 | 3/2017 |
| CN | 110324928 A | 10/2019 |

(Continued)

*Primary Examiner* — Rajarshi Chakraborty
*Assistant Examiner* — Nathaniel J Lee
(74) *Attorney, Agent, or Firm* — David P. Owen; Hoyng Rokh Monegier B.V.

(57) ABSTRACT

LED lamp assembly comprising a safety switch, a plurality of connector pins arranged at first and second ends of the LED lamp assembly, the connector pins being adapted for electrical connection to a lamp fixture, a plurality of filament simulation circuits, wherein at least one of the connector pins at each of the first and second ends is electrically coupled to a corresponding one of the filament simulation circuits, a plurality of rectifier circuits, one or more LEDs electrically coupled to an output of the rectifier circuits, and a safety switch control circuit operatively coupled to the safety switch. At least one of the connector pins at the first end is electrically coupled via the safety switch to an input of a first one of the rectifier circuits, and at least one of the connector pins at the second end is electrically coupled to an input of a second one of the rectifier circuits. The safety switch control circuit is arranged to close the safety switch when it detects electrical power having a frequency above a predetermined threshold at the connector pins at the first or second ends of the LED lamp assembly.

18 Claims, 5 Drawing Sheets

(56) References Cited

U.S. PATENT DOCUMENTS

| | | |
|---|---|---|
| 9,826,595 B2 | 11/2017 | Hsia |
| 9,913,336 B2 | 3/2018 | Xiong et al. |
| 10,448,479 B2 | 10/2019 | Xiong et al. |
| 2011/0149444 A1* | 6/2011 | Koolen ............... H05B 45/50 361/18 |
| 2011/0260614 A1 | 10/2011 | Hartikka et al. |
| 2013/0127327 A1 | 5/2013 | Heil et al. |
| 2013/0335959 A1* | 12/2013 | Hsia ................... H05B 45/50 362/221 |
| 2014/0117853 A1 | 5/2014 | Miyamichi |
| 2014/0225519 A1* | 8/2014 | Yu ..................... H05B 45/3725 315/200 R |
| 2016/0174326 A1 | 6/2016 | Van Dijk et al. |
| 2016/0227622 A1 | 8/2016 | Ackermann et al. |
| 2016/0270164 A1 | 9/2016 | Xiong et al. |
| 2016/0270166 A1* | 9/2016 | Xiong ............... H05B 45/3578 |
| 2017/0184294 A1 | 6/2017 | Tao |
| 2018/0132331 A1* | 5/2018 | Segers ................. H05B 45/50 |
| 2018/0279430 A1 | 9/2018 | Storm et al. |

FOREIGN PATENT DOCUMENTS

| | | |
|---|---|---|
| CN | 210840151 U | 6/2020 |
| EP | 2907365 B1 | 6/2014 |
| EP | 3028541 B1 | 2/2017 |
| EP | 3272190 B1 | 11/2018 |
| EP | 3364724 B1 | 12/2019 |
| WO | 2011138141 A2 | 11/2011 |
| WO | 2012127371 A1 | 9/2012 |
| WO | 2015028329 A1 | 3/2015 |
| WO | 2015028639 A1 | 3/2015 |
| WO | 2016050886 A1 | 4/2016 |
| WO | 2016146405 A1 | 9/2016 |
| WO | 2016151109 A1 | 9/2016 |
| WO | 2017012514 A1 | 1/2017 |
| WO | 2017124845 A1 | 7/2017 |
| WO | 2017174555 A1 | 10/2017 |
| WO | 2017194468 A1 | 11/2017 |
| WO | 2019048706 A1 | 3/2019 |

\* cited by examiner

ELECTRONIC SAFETY SWITCH FOR LED TUBE

TECHNICAL FIELD

The present invention relates to a safety endcap assembly for use in a light emitting diode (LED) lamp arrangement, which is arranged to replace a fluorescent lamp in a luminaire.

BACKGROUND

Fluorescent lamps are widely used in a variety of locations, such as schools and office buildings. Although conventional fluorescent lamps have certain advantages, they also pose certain disadvantages, including disposal problems due to the presence of toxic materials within the tube. LED-based lamps, or LED tubes, which can be used as one-for-one replacements for fluorescent tube lamps. Such LED-based replacement lamps typically include an elongate housing, with LEDs mounted inside the housing. An endcap is arranged at each longitudinal end of the housing for connecting the LED circuit board to the luminaire.

One problem when installing an LED tube into a lamp fixture designed for a fluorescent tube lamp or an LED tube lamp, is the potential hazardous contact with the exposed connector pins of the LED tube during installation. Unlike a fluorescent tube, an LED tube will typically have a current path formed by its internal circuitry between the connector pins on opposite ends of the LED tube. Accordingly, if the lamp fixture is energized when one end of the LED tube is plugged into the fixture and the person installing the LED tube touches the connectors at the other end of the LED tube, the person may experience an electrical shock.

Various types of mechanical safety switches have been proposed, usually implemented in the endcaps of an LED tube. However, these often rely on spring elements and moving parts which may fail and are difficult to use in some lamp fixtures with restricted access to a safety switch on an endcap once the LED tube has been installed.

SUMMARY OF THE INVENTION

It is an object of the invention to address one or more of the above problems. In a first aspect, the invention concerns an LED lamp assembly comprising a safety switch. The LED lamp assembly comprises a plurality of connector pins arranged at first and second ends of the LED lamp assembly, the connector pins being adapted for electrical connection to a lamp fixture, a plurality of filament simulation circuits, wherein at least one of the connector pins at each of the first and second ends of the LED lamp assembly is electrically coupled to a corresponding one of the filament simulation circuits, a plurality of rectifier circuits, one or more LEDs electrically coupled to an output of the rectifier circuits, and a safety switch control circuit operatively coupled to the safety switch. At least one of the connector pins arranged at the first end of the LED lamp assembly is electrically coupled via the safety switch to an input of a first one of the rectifier circuits, and at least one of the connector pins arranged at the second end of the LED lamp assembly is electrically coupled to an input of a second one of the rectifier circuits. The safety switch control circuit is arranged to close the safety switch when the safety switch control circuit detects electrical power having a frequency above a predetermined threshold at the connector pins arranged at the first end of the LED lamp assembly or at the connector pins arranged at the second end of the LED lamp assembly.

The LED lamp assembly has a safety switch at only one end, so that the at least one of the connector pins arranged at the second end of the LED lamp assembly is electrically coupled to an input of a second one of the rectifier circuits not via the safety switch. This avoids more complex configurations with two or more safety switches which are more expensive to produce.

When the safety switch is closed, electrical current can flow from one end to the other end of the LED lamp assembly, i.e. between the connector pins at opposite ends of the LED lamp assembly. When safety switch is open, electrical current cannot flow from one end to the other end of the LED lamp assembly via the circuit for supplying power to the LEDs, i.e. via the rectifier circuits. The safety switch is preferably a normally open switch, i.e. it assumes an open position when it is not energized.

The safety switch may comprise two switch elements connected in series, both switch elements being closed to electrically couple at least one of the connector pins arranged at the first end of the LED lamp assembly to an input of the first rectifier circuit. In this arrangement, the failure of one of the switch elements to the closed position does not result in closing of the safety switch, and it provides increased isolation. The safety switch preferably comprises an electro-mechanical relay, in which two switch contacts are used as two switch elements connected in series. Alternatively, the safety switch may comprise one or more semiconductor switch elements such as one or more transistors or MOSFETs or the like. By implementing the safety switch using semiconductor switch elements, the lifetime of the LED lamp assembly can be extended, and the audible noise during operation can be reduced.

The safety switch control circuit is preferably arranged to close the safety switch when the safety switch control circuit detects electrical power having a frequency above a predetermined threshold at the connector pins. The predetermined threshold may be set at a level (e.g. 10 kHz) to discriminate between electrical power received from a magnetic ballast or directly from a mains power supply (i.e. where no ballast is used) typically at a frequency of 50 or 60 Hz, and electrical power received from an electronic ballast, typically at a frequency of 20 kHz or higher. In this way, the safety switch control circuit can discriminate between the type of lamp fixture into which the LED lamp assembly is being installed.

When installed in a lamp fixture fitted with a magnetic ballast or without a ballast, the safety switch control circuit is configured to not close the safety switch, which remains in the open position. This prevents electrical current flowing from one end to the other end of the LED lamp assembly via the circuit for supplying power to the LEDs, thus reducing the risk of electric shock from the exposed connector pins during installation of the LED lamp assembly into a lamp fixture fitted with a magnetic ballast or not fitted with a ballast.

When installed in a lamp fixture fitted with an electronic ballast, the safety switch control circuit is configured to close the safety switch when it detects electric power applied between the two ends of the LED lamp assembly, i.e. only when both ends of the LED lamp assembly are installed into the lamp fixture, thus reducing the risk of electric shock from exposed connector pins during installation of the LED lamp assembly into a lamp fixture fitted with an electronic ballast.

The safety switch control circuit may be configured to provide a predetermined delay between detecting electrical power at a frequency above a predetermined threshold at the connector pins arranged at the first or second ends of the LED lamp assembly and closing the safety switch. This delay (e.g. a delay in the range of 1 to 100 ms) simulates the operation of a fluorescent tube, providing improved compatibility with electronic ballasts that may trigger a safety shutdown function in the absence of a delay. The delay also stabilizes the operation of the safety switch control circuit and helps to prevent erratic switching of the safety switch caused by variations in the output waveform of some types of electronic ballast.

The safety switch control circuit may be arranged with a first input electrically coupled to the connector pins at the first end of the LED lamp assembly and a second input electrically coupled to the connector pins at the second end of the LED lamp assembly, to receive electrical power as an input signal from both the first and second ends of the LED lamp assembly. This arrangement enables the safety switch control circuit to operate when receiving power and/or an input signal from either or both ends of the LED lamp assembly.

The safety switch control circuit preferably has an impedance between the first and second inputs of 10 kOhm or more, more preferably 100 kOhm or more. This reduces the amount of electrical current which may flow between the connector pins at opposite ends of the LED lamp assembly when the safety switch is open, further reducing the risk of dangerous electric shock from the exposed connector pins during installation of the LED lamp assembly into a lamp fixture, and reduces energy consumption of the LED lamp assembly.

In one embodiment, the safety switch control circuit comprises a first high pass filter electrically coupled one of the connector pins arranged at a first end of the LED lamp assembly 1, and a second high pass filter electrically coupled one of the connector pins arranged at a second end of the LED lamp assembly, and a logic circuit having a first input electrically coupled to the first high pass filter and a second input electrically coupled to the second high pass filter, and adapted to determine an output for control of the safety switch on the basis of the first input and/or the second input. The first input of the logic circuit may be electrically coupled to the first high pass filter via a third rectifier circuit, and the second input of the logic circuit may be electrically coupled to the second high pass filter via a fourth circuit rectifier circuit.

The LED lamp assembly may be adapted to withstand at least 1500V across the connector pins arranged at the first end of the LED lamp assembly and the connector pins arranged at the second end of the LED lamp assembly when the safety switch is open. The LED lamp assembly may also be adapted to conduct an electrical current equal to less than 0.7 mA between the connector pins arranged at the first end of the LED lamp assembly and the connector pins arranged at the second end of the LED lamp assembly when the safety switch is open.

The LED lamp assembly may be adapted for operation in a lamp fixture fitted with a magnetic ballast or an electronic ballast or no ballast, thus providing greater flexibility in usage of the LED lamp assembly.

The LED lamp assembly may be adapted to provide electrical power to the LEDs via the connector pins arranged at the second end of the LED lamp assembly and not from the connector pins arranged at the first end of the LED lamp assembly when the LED lamp assembly is operated in a lamp fixture fitted with a magnetic ballast or no ballast.

The LED lamp assembly may further comprise a switched-mode power supply, wherein the LED lamp assembly is adapted to provide electrical power to the LEDs via the switched-mode power supply when the safety switch control circuit detects electrical power having a frequency at or below the predetermined threshold at the connector pins arranged at the first end of the LED lamp assembly or at the connector pins arranged at the second end of the LED lamp assembly.

The LED lamp assembly may be adapted to disable or disconnect the switched-mode power supply from supplying electrical power to the LEDs when the safety switch control circuit detects electrical power having a frequency above the predetermined threshold at the connector pins arranged at the first end of the LED lamp assembly or at the connector pins arranged at the second end of the LED lamp assembly.

In the LED lamp assembly, a first one of the filament simulation circuits electrically coupled to at least one of the connector pins at the first end of the LED lamp assembly may have a first impedance, and a second one of the filament simulation circuits electrically coupled to at least one of the connector pins at the second end of the LED lamp assembly may have a second impedance higher than the first impedance, when electrical power having a frequency lower than 1 kHz is applied to the connector pins. The first rectifier circuit may be a half-wave rectifier and the second rectifier circuit may be a full-wave rectifier.

BRIEF DESCRIPTION OF THE DRAWINGS

The advantages of the invention will be apparent upon consideration of the following detailed disclosure of exemplary non-limiting embodiments of the invention, especially when taken in conjunction with the accompanying drawings wherein.

DETAILED DESCRIPTION OF PREFERRED EMBODIMENTS

Figure 1:
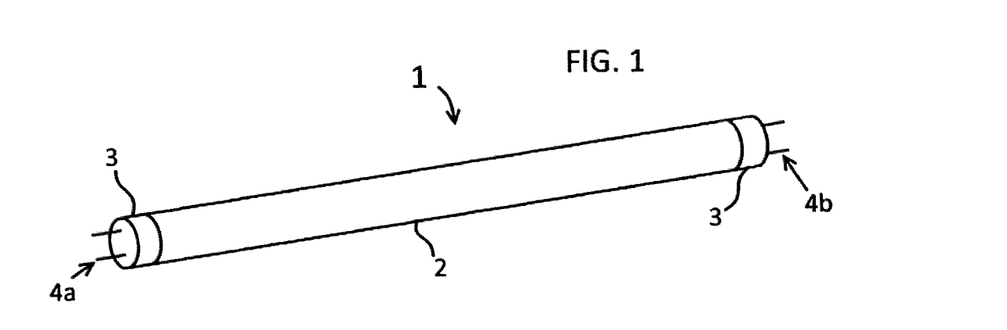
FIG. 1 shows an example of an LED lamp assembly.

FIG. 1 shows an embodiment of an LED lamp assembly 1. The LED lamp assembly 1 comprises a translucent or transparent elongate housing 2, having one or more LEDs arranged in the housing 2. An endcap assembly 3 is typically provided at each end of the housing 2, and connector pins 4a, 4b extend from the endcap assemblies. Although the LED lamp assembly 1 in this embodiment is in the form of an elongated tube, other shapes are also possible.

The connector pins 4a, 4b are externally exposed for connecting the LED lamp assembly 1 mechanically and electrically to a lamp fixture. The lamp fixture may be designed, for example, to receive standard-sized fluorescent tubes, such as T5, T8, T10, or T12 tubes. The LED lamp assembly 1 typically includes two connector pins 4a, 4b at each end of the housing 2, but other numbers of connector pins may be used in various arrangements to accommodate different designs of the LED lamp and the lamp fixture.

Figure 2:
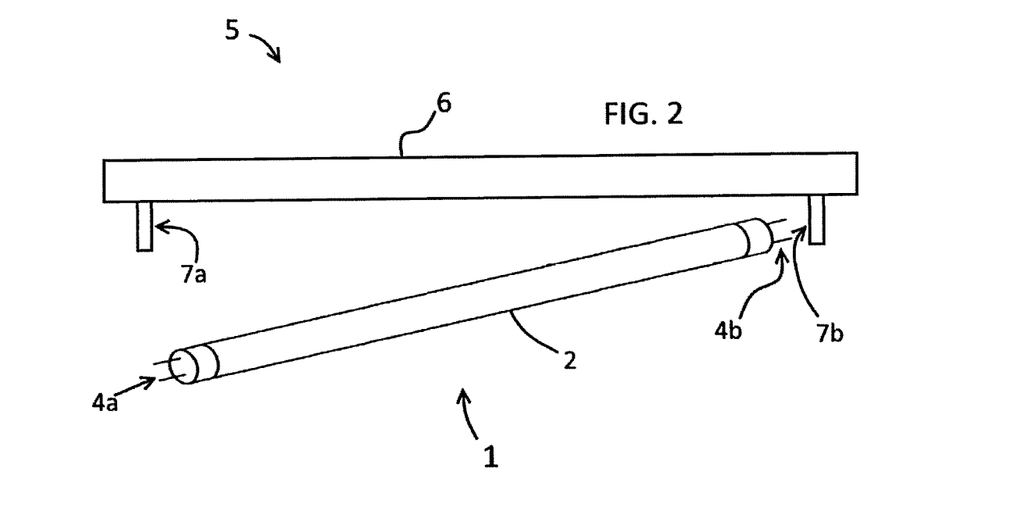
FIG. 2 illustrates an example of installing an LED lamp assembly into a lamp fixture.

FIG. 2 illustrates an example of installing the LED lamp assembly 1 into a lamp fixture 5. The installation process typically involves inserting one end of the LED lamp assembly 1 into the body 6 of the lamp fixture 5, so that the connector pins 4a, 4b at one end of the LED lamp assembly connect mechanically and electrically with corresponding fixture connectors 7a, 7b of the lamp fixture. In the situation shown, the connector pins 4b at the end being inserted will connect to fixture connectors 7b. However, it is possible that the lamp fixture is energized with electrical power during the installation process, so that an electrical voltage is present on the fixture connectors 7b.

The LED lamp assembly 1 typically includes an internal circuit for powering the LEDs in the lamp, and this internal circuit typically provides a path for electrical current to flow from one end of the LED lamp assembly 1 to the other end. In this situation, there is a danger that an electrical voltage will also be present on exposed connector pins 4a at the uninstalled end of LED lamp assembly 1, and create a risk of electrocution if the person installing the lamp accidentally comes into contact with the exposed connector pins 4a. Note that this situation can occur regardless of which end of the LED lamp assembly 1 is installed first into the lamp fixture, so that the uninstalled end can represent an electrical hazard.

In view of this problem, the LED lamp assembly 1 includes a safety switch 30 to provide a degree of electrical isolation between the connector pins 4a, 4b at each end of the LED lamp assembly 1.

Figure 3:
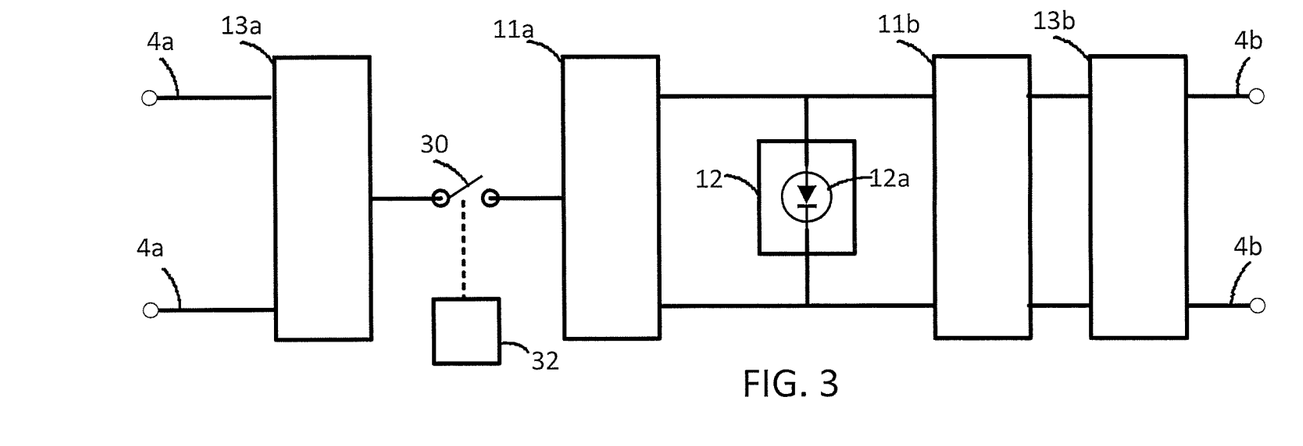
FIG. 3 is a simplified block diagram of an embodiment of an LED lamp assembly including a safety switch.

FIG. 3 shows a simplified block diagram of an embodiment of a LED lamp assembly 1 including a safety switch 30. For clarity of presentation, the diagram omits many components that may be necessary for operation of the lamp but are not relevant for the present explanation.

Figure 6:
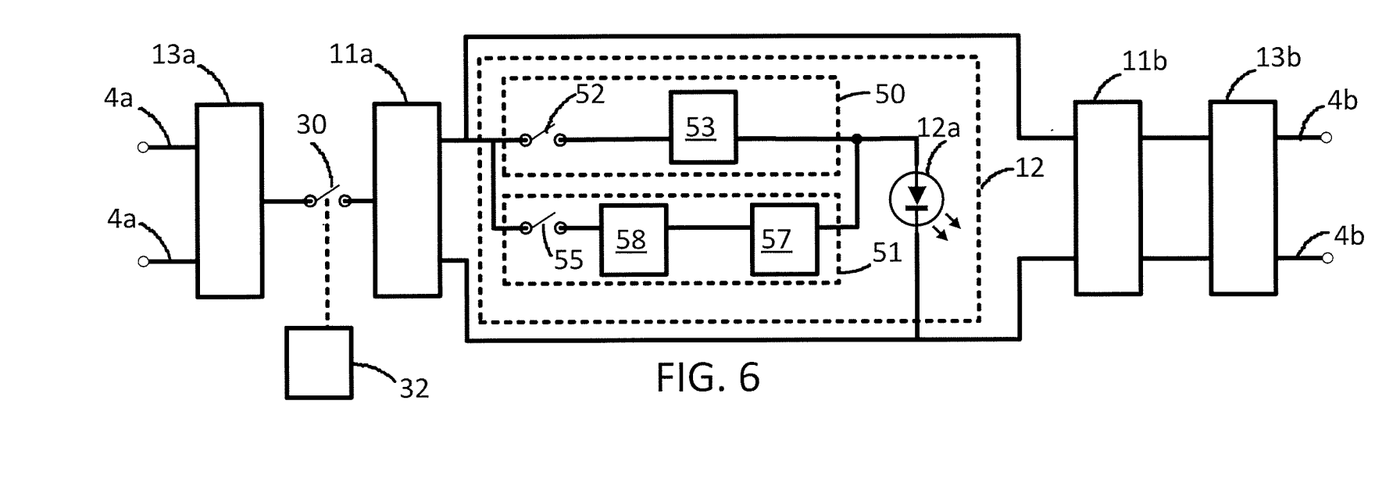
FIG. 6 is a simplified block diagram of an embodiment of the LED lamp assembly adapted for operation in lamp fixtures fitted with a magnetic ballast, an electronic ballast, or not fitted with a ballast.

In this example, the LED lamp assembly 1 includes at each end two connector pins 4a, 4b adapted for electrical connection to lamp fixture 5. The connector pins may also provide mechanical connection to the lamp fixture, and/or other connector pins or connection members may be provided for additional or alternative electrical and/or mechanical connection. The connector pins 4a, 4b at each end of the LED lamp assembly are electrically coupled to a corresponding rectifier circuit 11a, 11b, which may comprise a half-wave or full-wave rectifier in various embodiments. The output of rectifier circuits 11a, 11b is a rectified voltage which may provide electrical power to LED circuit 12 to generate light. LED circuit 12 may consist or one or more LEDs 12a connected across the outputs of the rectifier circuits 11a, 11b, or may include additional circuits (e.g. as shown in FIG. 6) which are connected to the outputs of the rectifier circuits 11a, 11b and provide electrical power to one or more LEDs 12a.

A circuit 13a, 13b is provided, connected to the two connector pins 4a, 4b, at each end of the LED lamp assembly. The circuits 13a, 13b may be used to simulate the heating filament present in a conventional fluorescent tube, as described further below.

A safety switch control circuit 32 is operatively coupled to the safety switch 30. At least one of the connector pins 4a arranged at one end of the LED lamp assembly 1 (referred to herein as the first end) is electrically coupled via the safety switch 30 to an input of a corresponding one of the rectifier circuits 11a, and at least one of the connector pins 4b arranged at the other end of the LED lamp assembly 1 (referred to herein as the second end) is electrically coupled to an input of a second one of the rectifier circuits 11b not via the safety switch. The LED lamp assembly 1 includes only one safety switch, although the switch may have multiple switch elements, e.g. multiple poles of an electro-mechanical relay.

As shown in FIG. 3, the safety switch 30 is connected between the connector pins 4a at the first end of the LED lamp assembly 1 and rectifier 11a arranged for supplying electrical power from connector pins 4a to the LEDs 12a. The LED lamp assembly 1 has only one safety switch arranged at only one end, so that connector pins 4b at the second end of the LED lamp assembly 1 are electrically coupled to an input of the second rectifier circuit 11b without an intervening switch. This avoids more complex configurations with two or more safety switches which are more expensive to produce When safety switch 30 is closed, electrical current can flow from the connector pins 4a at the first end of the LED lamp assembly 1 via the rectifiers 11a, 11b which supply of electrical power to the LEDs 12a to the connector pins 4b at the second end of the LED lamp assembly 1. This enables electrical current to flow from one end to the other end of the LED lamp assembly 1, i.e. between connector pins 4a, 4b at each end of the LED lamp assembly 1. Note that this is necessary if the LED lamp assembly 1 is operated in a lamp fixture 5 which supplies electrical power between the connector pins at each end of the LED lamp assembly.

When safety switch 30 is open, the electrical connection between the connector pins 4a and rectifier 11a is broken. This prevents electrical current from flowing from one end to the other end of the LED lamp assembly 1 via the circuit for supplying power to the LEDs 12a, i.e. via rectifiers 11a and 11b. Note that the LED lamp assembly 1 can still be operated with safety switch 30 open, when installed in a lamp fixture 5 which supplies electrical power to the connector pins 4b at the second end of the LED lamp assembly 1.

The safety switch 30 is preferably a normally open switch, i.e. it assumes the open position when the safety switch 30 is not energized. This prevents electrical current from flowing from one end to the other end of the LED lamp assembly 1 in the absence of any power applied to the LED lamp assembly, thus assuming the safe position.

The safety switch 30 may comprise two switch elements connected in series, both switch elements being closed to electrically couple at least one of the connector pins 4a arranged at the first end of the LED lamp assembly 1 to an input of the first rectifier circuit 11a. This provides redundancy, so that failure of one of the switch elements to the closed position does not result in closing of the safety switch 30, and also provides increased isolation. The safety switch 30 preferably comprises an electro-mechanical relay, in which two switch contacts are used as two switch elements connected in series. Alternatively, the safety switch 30 may comprise one or more semiconductor switch elements such as one or more transistors or MOSFETs or the like.

The safety switch control circuit 32 is arranged to close the safety switch 30 when the safety switch control circuit 32 detects electrical power having a frequency above a predetermined threshold at the connector pins 4a, 4b. The predetermined threshold may be set at a level (e.g. 10 kHz) to discriminate between electrical power received from a magnetic ballast or directly from a mains power supply (i.e. where no ballast is used) typically at a frequency of 50 or 60 Hz, and electrical power received from an electronic ballast, typically at a frequency of 20 kHz or higher.

In this way, the safety switch control circuit 32 can discriminate between the type of lamp fixture 5 into which the LED lamp assembly 1 is being installed. When installed in a lamp fixture 5 fitted with a magnetic ballast or without a ballast (so that the connectors pins 4a, 4b receive electrical power at a low frequency, such as 50 or 60 Hz), the safety switch control circuit 32 is arranged to not close the safety switch 30, which remains in the open position. This prevents electrical current flowing from one end to the other end of the LED lamp assembly 1 via the circuit for supplying power to the LEDs 12a, thus addressing the problem of potential electric shock from exposed connector pins during installation of the LED lamp assembly 1 into a lamp fixture 5 fitted with a magnetic ballast or not fitted with a ballast.

The LED lamp assembly 1 may be adapted to provide electrical power to the LEDs 12a via the connector pins 4b arranged at the second end of the LED lamp assembly 1 and not from the connector pins 4a arranged at the first end of the LED lamp assembly 1 when the LED lamp assembly 1 is operated in a lamp fixture 5 fitted with a magnetic ballast 21 or no ballast. In this embodiment, the second rectifier circuit 11b is preferably implemented as a full-wave rectifier, to enable efficient supply of electrical power to the LEDs 12a from the connectors 4b arranged at the second end of the LED lamp assembly 1. In this way, the LED lamp assembly 1 can be operated when installed in this type of lamp fixture 5 as explained further in the description of FIGS. 7 and 9. Note that the first rectifier circuit 11a may be implemented as a full-wave or half-wave rectifier, as the first rectifier circuit 11a supplies electrical power to LEDs 12a when the LED lamp assembly 1 receives electrical power from the connector pins 4a, 4b arranged at both ends of the LED lamp assembly 1.

When installed in a lamp fixture 5 fitted with an electronic ballast (so that the connectors pins 4a, 4b receive electrical power at a high frequency, such as 20 kHz), the safety switch control circuit 32 is arranged to close the safety switch 30 when it detects the electric power at both ends of the LED lamp assembly 1. In this type of lamp fixture 5, the electrical power is applied between the two ends of a lamp, i.e. between connector pins 4a at the first end and connector pins 4b at the second end. During installation of the LED lamp assembly 1 into this type of fixture, when only one end of the lamp has been installed in the lamp fixture and the other end is not yet installed, the safety switch control circuit 32 does not detect the electrical power and does not close the safety switch 30. This prevents electrical current flowing from one end to the other end of the LED lamp assembly 1 via the circuit for supplying power to the LEDs 12a, thus addressing the problem of potential electric shock from exposed connector pins during installation of the LED lamp assembly 1 into a lamp fixture 5 fitted with an electronic ballast. Once both ends of the LED lamp assembly 1 have been installed in this type of lamp fixture 5, the safety switch control circuit 32 will detect the electrical power applied to the connector pins 4a, 4b at both ends of the LED lamp assembly 1 and will close safety switch 30 to enable operation of the lamp, as explained in the description of FIG. 8.

The safety switch control circuit 32 may be configured to provide a predetermined delay between detecting electrical power at a frequency above a predetermined threshold at the connector pins 4a, 4b arranged at the first or second ends of the LED lamp assembly 1 and closing the safety switch 30. This delay provides several benefits. The delay simulates the operation of a fluorescent tube, which usually requires a short delay after receiving electrical power and lighting the tube. Some electronic ballasts are designed to detect this delay, and perform a safety shutdown if used with a lamp which draws an operating current immediately. The short delay period (e.g. a delay in the range of 1 to 100 ms) implemented in the safety switch control circuit 32 simulates a fluorescent tube and avoids this type of safety shutdown. In addition, the delay stabilizes the operation of the safety switch control circuit 32 and helps to prevent erratic switching of the safety switch 30 caused by variations in the output waveform of some types of electronic ballast.

The LED lamp assembly 1 with safety switch 30 is preferably designed to meet one or more of the requirements specified in applicable safety regulations, such as IEC standard 62776:2014 entitled "double-capped LED lamps designed to retrofit linear fluorescent lamps—safety specifications". The LED lamp assembly 1 is preferably able to withstand a voltage of at least 1500V (preferably at least 2500V, for example in case the safety switch 30 is implemented using one or more semiconductor switch elements) applied between both ends of the LED lamp assembly when the safety switch 30 is open, i.e. 1500V between connector pins 4a arranged at the first end of the LED lamp assembly 1 and connector pins 4b arranged at the second end of the LED lamp assembly 1, without flashover or breakdown. The LED lamp assembly 1 preferably conducts an electrical current equal to or less than 0.7 mA peak, i.e. between connector pins 4a arranged at the first end of the LED lamp assembly 1 and connector pins 4b arranged at the second end of the LED lamp assembly 1, when a voltage of 500V is applied between both ends of the LED lamp assembly and the safety switch 30 is open.

Figure 4:
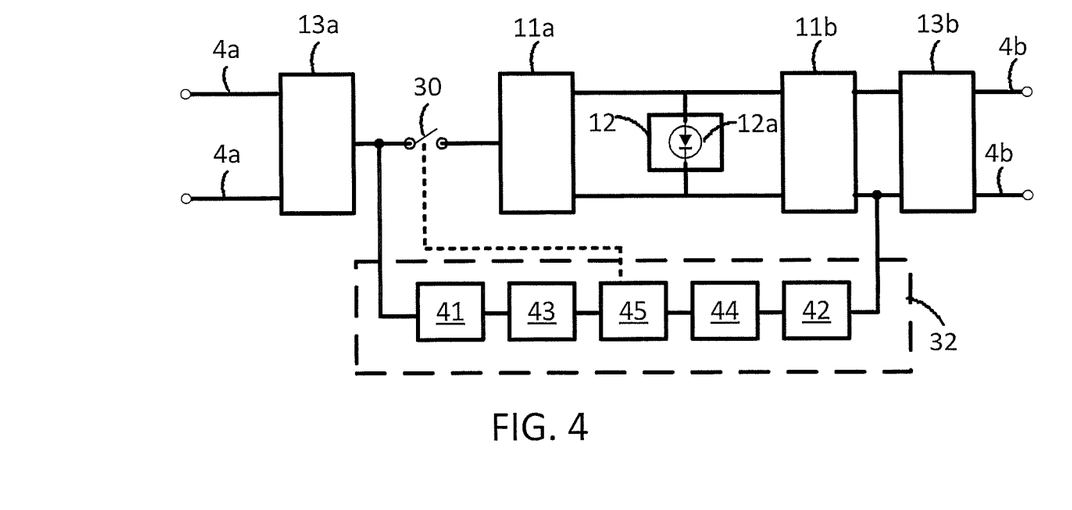
FIG. 4 is a simplified block diagram showing further details of the LED lamp assembly of FIG. 3.

FIG. 4 shows a simplified block diagram showing further details of one embodiment of an LED lamp assembly 1. In this embodiment, the safety switch control circuit 32 is powered from and receives inputs from both ends of the LED lamp assembly 1. The safety switch control circuit 32 has a first input electrically coupled to the connector pins 4a (via the filament simulation circuit 13a in this embodiment) at the first end of the LED lamp assembly 1, the electrical coupling being made to a point on the connector pin side of the safety switch 30 so that the safety switch control circuit 32 receives electrical power from the connector pins 4a even when the safety switch 30 is open. The safety switch control circuit 32 has a second input electrically coupled to one of the connector pins 4b (via the filament simulation circuit 13b in this embodiment) at the second end of the LED lamp assembly 1. This arrangement enables the safety switch control circuit 32 to receive electrical power from the connector pins 4a, 4b at either or both ends of LED lamp assembly 1 regardless of the state safety switch 30. In this way, the safety switch control circuit 32 is energized and can control the safety switch 30 also during installation of the LED lamp assembly 1 into a lamp fixture 5 when the connector pins 4a, 4b at either end of LED lamp assembly 1 make a connection with the corresponding connectors in the lamp fixture and receive electrical power from the lamp fixture.

The safety switch control circuit 32 preferably has a high input impedance, e.g. 10 kOhm, preferably 100 kOhm or more (measured at a frequency of 10 kHz) between its two inputs, so that when the safety switch 30 is open the impedance between the two ends of the LED lamp assembly is also high. This limits the amount of electrical current flowing through the safety switch control circuit 32 and the amount of power wasted in the control circuit, and also reduces the electrical current flowing through the LED lamp assembly 1 to a low value when the safety switch 30 is open (preferably to less than 0.7 mA peak when a voltage of 500V is applied between both ends of the LED lamp assembly). This low leakage current enables the LED lamp assembly 1 to meet applicable safety regulations, and provides greater compatibility with a range of electronic ballast. Some designs of electronic ballast will perform a safety shutdown if the leakage current is too high, and an input impedance of 250 kOhm or more is preferred to enable wide compatibility with electronic ballasts on the market.

In this embodiment, the safety switch control circuit 32 comprises a first high pass filter 41 electrically coupled one of the connector pins 4a at a first end of the LED lamp assembly 1, and a second high pass filter 42 electrically coupled one of the connector pins 4b arranged at a second end of the LED lamp assembly 1. The safety switch control circuit 32 also comprises a logic circuit 45 having a first input electrically coupled to the first high pass filter 41 and a second input electrically coupled to the second high pass filter 42, and is adapted to determine an output for control of the safety switch 30 on the basis of the first input and/or the second input.

The safety switch control circuit 32 may also include rectifier circuits 43 and 44, where the first input of the logic circuit 45 is electrically coupled to the first high pass filter 41 via a third rectifier circuit 43, and the second input of the logic circuit 45 is electrically coupled to the second high pass filter 42 via a fourth circuit rectifier circuit 44.

The high pass filters 41, 42 operate to pass a high frequency signal, e.g. in the form of a high frequency electrical voltage or current, from the connectors pins 4a, 4b, while substantially blocking or reducing a low frequency signal. For example, the high pass filters 41, 42 may be configured to pass electrical current from the connectors pins 4a, 4b when the pins receive electrical power at a frequency above a predetermined threshold, e.g. above 10 kHz, such as may be expected when the LED lamp assembly 1 is installed in a lamp fixture 5 fitted with an electronic ballast operating at 20 kHz, and the high pass filters 41, 42 may be configured to substantially block or reduce electrical current from the connectors pins 4a, 4b when the pins receive electrical power at a frequency below a predetermined threshold, e.g. below 10 kHz, such as may be expected when the LED lamp assembly 1 is installed in a lamp fixture 5 fitted with a magnetic ballast or with no ballast, operating at 50 or 60 Hz. In this way, the safety switch control circuit 32 can discriminate between the type of lamp fixture into which the LED lamp assembly 1 is being installed, i.e. a lamp fixture 5 fitted with a magnetic ballast or without a ballast (so that the connectors pins 4a, 4b receive electrical power at a low frequency, such as 50 or 60 Hz) or a lamp fixture fitted with an electronic ballast (so that the connectors pins 4a, 4b receive electrical power at a high frequency, such as 20 kHz).

The rectifier circuits 43 and 44, when included in the circuit, rectify the output from the high pass filters 41 and 42, providing a DC electrical current for providing electrical power and an input signal to the logic circuit 45.

The logic circuit 45 receives an electrical signal via the high pass filters 41, 42, and implements a delay of a predetermined time period between detecting electrical power at a frequency above a predetermined threshold at the connector pins 4a, 4b arranged at the first or second ends of the LED lamp assembly 1 and closing the safety switch 30, as described above. This delay simulates the delayed start of a fluorescent tube to improve compatibility with electronic ballasts which have a safety shutdown function, and to stabilize operation of the safety switch control circuit 32 to prevent erratic switching of the safety switch 30 caused by variations in the output waveform of some electronic ballasts.

The logic circuit 45 may be implemented using discrete logic, such as an op-amp comparator circuit, or using a programmable microcontroller, FPGA, or other type of circuit.

Figure 5:
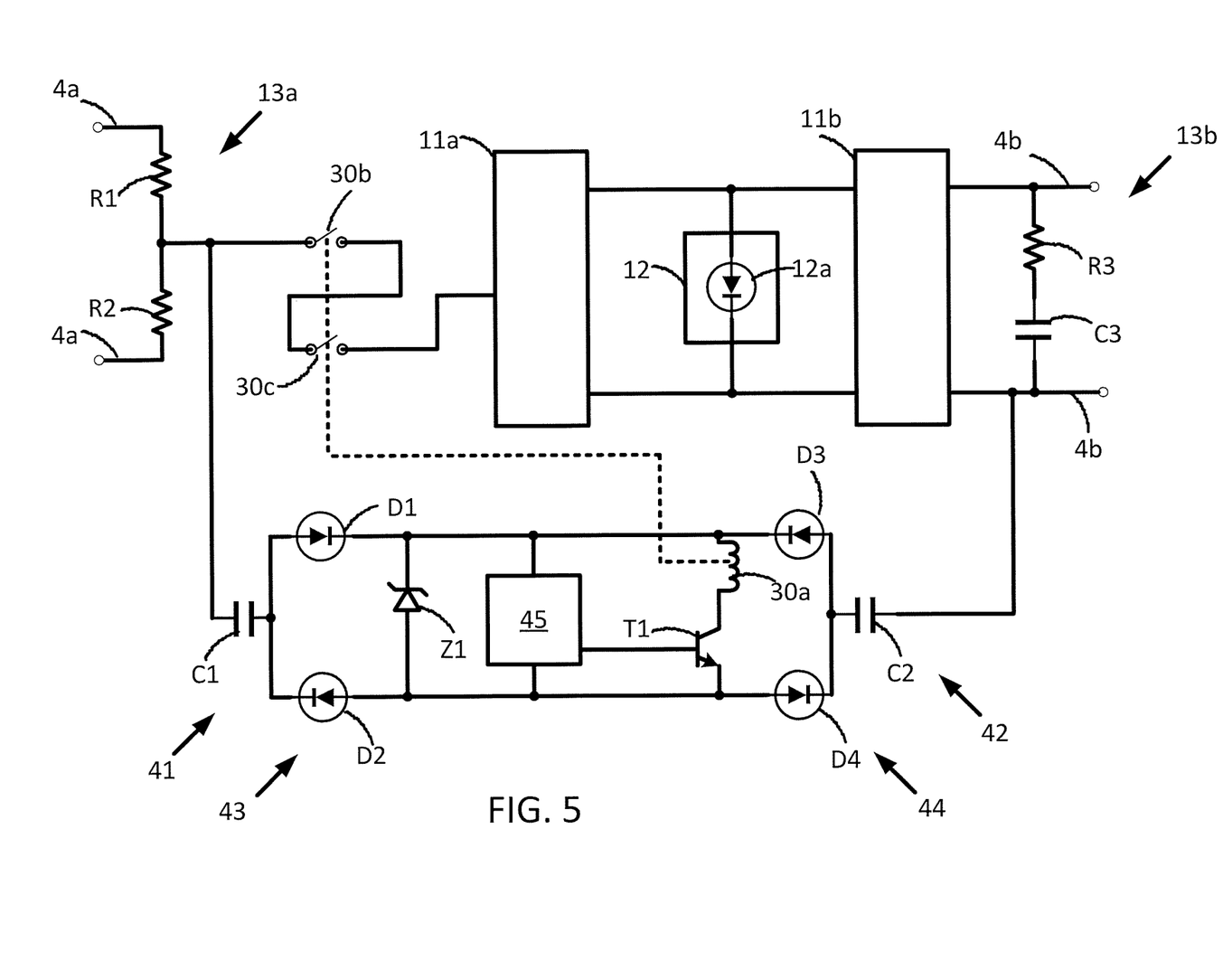
FIG. 5 is a simplified circuit diagram of one embodiment of a safety switch control circuit for an LED lamp assembly with a safety switch.

FIG. 5 shows a simplified circuit diagram of one embodiment of the safety switch control circuit 32.

In this embodiment, the first filament simulation circuit 13a comprises resistors R1, R2 connected in series between two connector pins 4a at the first end of the LED lamp assembly 1, and the second filament simulation circuit 13b comprises resistor R3 and capacitor C3 connected in series between two connector pins 4b at the second end of the LED lamp assembly 1. The safety switch 30 comprises an electromagnetic relay having a coil 30a and two switch contacts 30b and 30c connected in series. The safety switch 30 is connected to the resistors R1, R2 on one side of the switch and the rectifier circuit 11a on the other side of the switch, so that the safety switch 30 operates to connect or disconnect the connector pins 4a at the first end of the LED lamp assembly 1 to the rectifier circuit 11a.

In this embodiment the high pass filters 41 and 42 comprise capacitors C1 and C2 respectively, and the third and fourth rectifier circuits 43 and 44 comprise diodes D1, D2 and D3, D4 respectively. Capacitor C1 is connected between resistors R1 and R2 on one side and between diodes D1 and D2 on the other side, and capacitor C2 is connected between connector pin 4b on one side and between diodes D3 and D4 on the other side.

A Zener diode Z1 is connected across the outputs of the third and fourth rectifier circuits 43 and 44 to stabilize the rectified voltage. Logic circuit 45 is connected across the rectified voltage outputs of the third and fourth rectifier circuits 43, 44. Logic circuit 45 drives a transistor T1, which energizes coil 30a of the safety switch 30 when the transistor T1 is turned on, and de-energizes coil 30a when the transistor T1 is turned off. Switch contacts 30b and 30c of safety switch 30 are connected in series, and the switch contacts 30b, 30c are closed when coil 30a is energized, and open when coil 30a is de-energized.

In this embodiment, the filament simulation circuits 13a and 13b are different. The first filament simulation circuit 13a (comprising resistive elements R1, R2 connected in series in the example shown in FIG. 5) provides a low resistive impedance between the two connector pins 4a at the first end of the LED lamp assembly 1 regardless of whether the electrical power applied to the first connector pins 4a has a low or high frequency. The second filament simulation circuit 13b (comprising resistive element R3 and capacitive element C3 connected in series in the example shown in FIG. 5) provides a variable impedance between the two connector pins 4b at the second end of the LED lamp assembly 1, the impedance varying in dependence on the frequency of the electrical power applied to the two connector pins 4b at the second end of the LED lamp assembly 1. The second filament simulation circuit 13*b* provides a higher impedance when the electrical power applied to connector pins 4*b* has a high frequency (e.g. when the electrical power is supplied from an electronic ballast operating at 20 kHz), and provides a lower impedance when the electrical power applied to connector pins 4*b* has a low frequency (e.g. when the electrical power is supplied from a magnetic ballast operating at 50 or 60 Hz).

FIG. 6 shows a simplified block diagram of one embodiment of the LED lamp assembly 1 adapted for operation in a variety of types of lamp fixtures 5, fitted with a magnetic ballast, and electronic ballast, or without a ballast.

The LED lamp assembly 1 in this embodiment comprises an LED circuit 12 having a first power supply circuit 50 for supplying power to the LEDs 12*a* when the LED lamp assembly 1 is supplied with electrical power having a frequency above a predetermined threshold, e.g. power supplied from an electronic ballast 25 at a frequency of 20 kHz or higher. The LED circuit 12 in this embodiment also comprises a second power supply circuit 51 for supplying power to the LEDs 12*a* when the LED lamp assembly 1 is supplied with electrical power having a frequency below a predetermined threshold, e.g. power supplied from a magnetic ballast 21 or not via a ballast at a frequency of 50 or 60 Hz.

The LED lamp assembly 1 may be adapted to disable or disconnect the switched-mode power supply 57 from supplying electrical power to the LEDs 12*a* when the electrical power supplied to the LED lamp assembly 1 has a frequency above a predetermined threshold. For example, a separate frequency detector circuit (not shown in FIG. 6) may be included in the LED lamp assembly for this, which controls a first switch 52 to connect/enable or disconnect/disable the first power supply circuit 50 for supplying electrical power to the LEDs 12*a*, and a second switch 55 to connect/enable or disconnect/disable the second power supply circuit 51, including the switched-mode power supply 57, for supplying electrical power to the LEDs 12*a*.

The first power supply circuit 50 may comprise a variable impedance 53, which is configured to have a relatively higher impedance when the LED lamp assembly 1 is supplied with electrical power from a constant power electronic ballast, and a relatively lower impedance when supplied from a constant current electronic ballast. The variable impedance 53 may be configured to switch to the higher impedance mode when the electrical current or voltage supplied to the LED lamp assembly 1 is detected to be above a predetermined threshold (e.g. a current or voltage detector circuit may be included in the LED lamp assembly for this), indicating that the electrical power is supplied from a constant power electronic ballast. Further details of the LED lamp assembly 1 comprising first and second power supply circuits 50, 51 can be found in U.S. Pat. No. 10,342,079 which incorporated herein by reference in its entirety.

Figure 8:
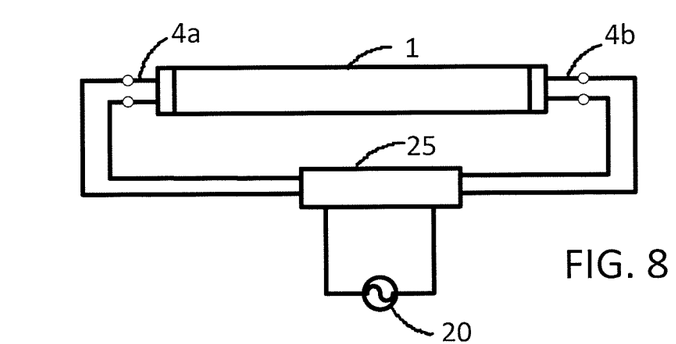
FIG. 8 is a simplified circuit diagram of an LED lamp assembly installed in a lamp fixture fitted with an electronic ballast.
Figure 9:
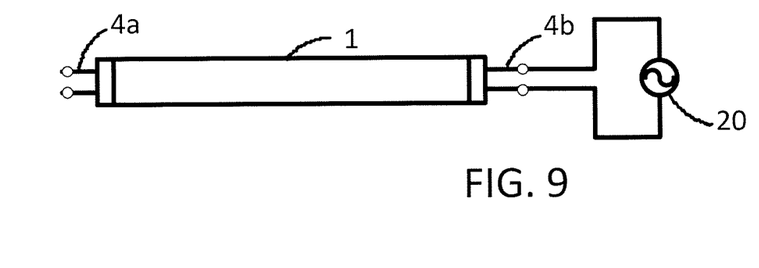
FIG. 9 is a simplified circuit diagram of an LED lamp assembly installed in a lamp fixture that is not fitted with any ballast.

The LED lamp assembly 1 is preferably adapted for operation in a lamp fixture 5 fitted with a magnetic ballast or an electronic ballast or not fitted with any ballast. To better understand the operation of the LED lamp assembly 1, FIGS. 7-9 illustrate various modes of use of the LED lamp assembly 1 in different types of lamp fixtures.

Figure 7:
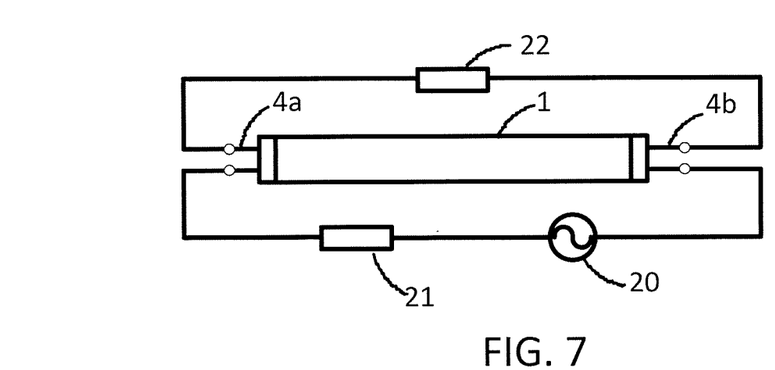
FIG. 7 is a simplified circuit diagram of an LED lamp assembly installed in a lamp fixture fitted with a magnetic ballast.

FIG. 7 shows a simplified circuit diagram of LED lamp assembly 1 installed in a lamp fixture that includes a magnetic (i.e. inductive) ballast 21. AC power 20 is supplied via magnetic ballast 21 to connector pins 4*a*, 4*b* at each end of the LED lamp assembly 1. AC power 20 is typically mains power, e.g. 110/120 Vac or 230/240 Vac at a frequency of 50 or 60 Hz. A lamp fixture fitted with a magnetic ballast and designed for operating fluorescent tubes will typically include a starter unit 22, connected to connector pins 4*a*, 4*b* at each end of the LED lamp, for supplying a starting voltage to ignite a fluorescent tube. When an LED lamp is installed in a lamp fixture of this design, a starter unit 22 providing a low impedance across its terminals is typically fitted in the lamp fixture, to replace any existing starter unit. This provides a short circuit across the starter unit 22 and completes an electrical circuit to bring the AC power to one end of the LED lamp assembly.

In this example, the first end of the LED lamp assembly 1 (on the left side of FIG. 7) includes the safety switch 30. The filament simulation circuit 13*a* at the first end (see FIG. 3) has a low impedance, for example comprising resistive elements providing a resistance between the connector pins 4*a* at the first end of e.g. 10-20 Ohms. The filament simulation circuit 13*b* at the second end (see FIG. 3) has a low impedance at high frequencies (e.g. frequencies of 10 kHz and above) and a high impedance at low frequencies (e.g. frequencies below 1 kHz, such as 50 or 60 Hz). The filament simulation circuit 13 at the second end may comprise, for example, resistive and capacitive elements providing a resistance between the connector pins 4*b* at the second end of e.g. several MOhm at 50 or 60 Hz, and 10-20 Ohms at 20 kHz.

In this configuration, electrical power is supplied from AC power 20 via the magnetic ballast 21, the connector pins 4*a* and filament simulation circuit 13*a* at the first (left) end of the LED lamp assembly 1, and the modified starter unit 22, to the connector pins 4*b* at the second (right) end of the LED lamp assembly 1. The safety switch control circuit 32 detects the electrical power applied to the connector pins 4*a*, 4*b*. As the frequency of the electrical power is low, e.g. 50 or 60 Hz and below a predetermined threshold, the safety switch control circuit 32 does no close the safety switch 30, which remains open, disconnecting at least one of the connector pins 4*a* from a remaining part of the circuitry of the LED lamp assembly 1.

During installation of the LED lamp assembly 1, one end of the LED lamp assembly 1 is installed first, and the connector pins 4*a* or 4*b* at the end which is installed become connected with the corresponding connectors in the lamp fixture and receive electrical power. However, the safety switch 30 remains open, preventing electrical current from flowing through the LED lamp assembly 1, so that any accidental touching of the exposed connector pins 4*a* or 4*b* at the uninstalled end of the LED lamp assembly 1 does not result in an electrical shock.

Once fully installed, the LED lamp assembly 1 receives electrical power via the connector pins 4*b* at the second end of the LED lamp assembly 1, and the LEDs 12*a* are powered via the connector pins 4*b* enabling normal operation of the LED lamp.

FIG. 8 shows a simplified circuit diagram of LED lamp assembly 1 installed in a lamp fixture that includes an electronic ballast 25. AC power 20 is supplied to the electronic ballast 25, which outputs electrical power at a high frequency, typically at 20 kHz or higher. The electronic ballast 25 applies electrical power across the LED lamp assembly 1, between the connector pins 4*a* at the first end and the connector pins 4*b* at the second end of the LED lamp assembly 1.

During installation of the LED lamp assembly 1, one end of the LED lamp assembly 1 is installed first, and the connector pins 4*a* or 4*b* at the end which is installed become connected with the corresponding connectors in the lamp fixture and receive electrical power. However, the safety switch 30 remains open, preventing electrical current from flowing through the LED lamp assembly 1, so that any accidental touching of the exposed connector pins 4a or 4b at the uninstalled end of the LED lamp assembly 1 does not result in an electrical shock.

Once fully installed in the lamp fixture 5, the safety switch control circuit 32 detects the electrical power applied between the connector pins 4a, 4b at each end. As the frequency of the electrical power is high, e.g. 20 kHz and above the predetermined threshold, the safety switch control circuit 32 closes the safety switch 30, which connects the connectors pins 4a at the first end of the LED lamp assembly 1, rectifiers 11a and 11b and the connectors pins 4b at the second end of the LED lamp assembly 1, completing a circuit between both ends of the LED lamp assembly 1 and enabling electrical current to flow through the circuit supplying electrical power to the LEDs 12a.

FIG. 9 shows a simplified circuit diagram of LED assembly lamp 1 installed in a lamp fixture designed without a ballast. AC power 20 is supplied to the connector pins 4a, 4b at only one end of the LED lamp assembly 1. AC power 20 is typically mains power, e.g. 110/120 Vac or 230/240 Vac at a frequency of 50 or 60 Hz.

As described above in relation to FIGS. 7 and 8, during installation of the LED lamp assembly 1 the safety switch 30 remains open, preventing electrical current from flowing through the LED lamp assembly 1, so that any accidental touching of the exposed connector pins at the uninstalled end of the LED lamp assembly 1 does not result in an electrical shock. Once fully installed in the lamp fixture 5, with the connector pins 4b at the second end of the LED lamp assembly receiving electrical power from the lamp fixture 5, the LEDs 12a are powered via the connector pins 4b enabling normal operation of the LED lamp.

In this disclosure the terms "open" and "close" encompass on/off switching such as produced by an electromechanical relay, or turning off and turning on of a transistor or MOSFET or the like, i.e. variation between an on or connected state with relatively low impedance, to an off or disconnected state with relatively high impedance.

It will be appreciated by the skilled person that the embodiments described herein all relate to an LED lamp assembly having a safety switch, and features described in relation to one embodiment may be used with or combined with features of the other embodiments. While the principles of the invention have been set out above in connection with specific embodiments, it is to be understood that this description is merely made by way of example and not as a limitation of the scope of protection, which is determined by the appended claims.

The invention claimed is:

1. An LED lamp assembly comprising a safety switch, the LED lamp assembly comprising:
   a plurality of connector pins arranged at first and second ends of the LED lamp assembly, the connector pins being adapted for electrical connection to a lamp fixture;
   a plurality of filament simulation circuits, wherein at least one of the connector pins at each of the first and second ends of the LED lamp assembly is electrically coupled to a corresponding one of the filament simulation circuits;
   a plurality of rectifier circuits;
   one or more LEDs electrically coupled to an output of the rectifier circuits;
   a safety switch control circuit operatively coupled to the safety switch;
   wherein at least one of the connector pins arranged at the first end of the LED lamp assembly is electrically coupled via the safety switch to an input of a first one of the rectifier circuits, and at least one of the connector pins arranged at the second end of the LED lamp assembly is electrically coupled to an input of a second one of the rectifier circuits;
   wherein the safety switch control circuit is arranged to close the safety switch when the safety switch control circuit detects electrical power having a frequency above a predetermined threshold at the connector pins arranged at the first end of the LED lamp assembly and at the connector pins arranged at the second end of the LED lamp assembly.

2. The LED lamp assembly according to claim 1, wherein the safety switch control circuit is configured to provide a predetermined delay between detecting electrical power at a frequency above the predetermined threshold at the connector pins arranged at the first and second ends of the LED lamp assembly and closing the safety switch.

3. The LED lamp assembly according to claim 1, wherein the safety switch control circuit has a first input electrically coupled to the connector pins at the first end of the LED lamp assembly and a second input electrically coupled to the connector pins at the second end of the LED lamp assembly, to receive electrical power as an input signal from both the first and second ends of the LED lamp assembly.

4. The LED lamp assembly according to claim 3, wherein the safety switch control circuit has an impedance between the first and second inputs of 10 kOhm or more.

5. The LED lamp assembly according to claim 1, wherein the safety switch control circuit comprises:
   a first high pass filter electrically coupled one of the connector pins arranged at a first end of the LED lamp assembly, and a second high pass filter electrically coupled one of the connector pins arranged at a second end of the LED lamp assembly; and
   a logic circuit having a first input electrically coupled to the first high pass filter and a second input electrically coupled to the second high pass filter, and adapted to determine an output for control of the safety switch on the basis of the first input and/or the second input.

6. The LED lamp assembly according to claim 5, wherein the first input of the logic circuit is electrically coupled to the first high pass filter via a third rectifier circuit, and the second input of the logic circuit is electrically coupled to the second high pass filter via a fourth circuit rectifier circuit.

7. The LED lamp assembly according to claim 1, wherein the safety switch comprises two switch elements connected in series, both switch elements being closed to electrically couple at least one of the connector pins arranged at the first end of the LED lamp assembly to an input of the first rectifier circuit.

8. The LED lamp assembly according to claim 1, wherein the LED lamp assembly is able to withstand at least 1500V across the connector pins arranged at the first end of the LED lamp assembly and the connector pins arranged at the second end of the LED lamp assembly when the safety switch is open.

9. The LED lamp assembly according to claim 1 wherein the LED lamp assembly conducts an electrical current equal to or less than 0.7 mA between the connector pins arranged at the first end of the LED lamp assembly and the connector pins arranged at the second end of the LED lamp assembly when the safety switch is open.

10. The LED lamp assembly according to claim 1, wherein the LED lamp assembly is adapted for operation in a lamp fixture fitted with a magnetic ballast or an electronic ballast or no ballast.

11. The LED lamp assembly according to claim 1, wherein the LED lamp assembly is adapted to provide electrical power to the LEDs via the connector pins arranged at the second end of the LED lamp assembly and not from the connector pins arranged at the first end of the LED lamp assembly when the LED lamp assembly is operated in a lamp fixture fitted with a magnetic ballast or no ballast.

12. The LED lamp assembly according to claim 1, further comprising a switched-mode power supply, wherein the LED lamp assembly is adapted to provide electrical power to the LEDs via the switched-mode power supply when the safety switch control circuit detects electrical power having a frequency at or below the predetermined threshold at the connector pins arranged at the first end of the LED lamp assembly or at the connector pins arranged at the second end of the LED lamp assembly.

13. The LED lamp assembly according to claim 12, wherein the LED lamp assembly is adapted to disable or disconnect the switched-mode power supply from supplying electrical power to the LEDs when the safety switch control circuit detects electrical power having a frequency above the predetermined threshold at the connector pins arranged at the first end of the LED lamp assembly or at the connector pins arranged at the second end of the LED lamp assembly.

14. The LED lamp assembly according to claim 1, wherein a first one of the filament simulation circuits electrically coupled to at least one of the connector pins at the first end of the LED lamp assembly has a first impedance, and a second one of the filament simulation circuits electrically coupled to at least one of the connector pins at the second end of the LED lamp assembly has a second impedance higher than the first impedance, when electrical power having a frequency lower than 1 kHz is applied to the connector pins.

15. The LED lamp assembly according to claim 1, wherein the first rectifier circuit is a half-wave rectifier and the second rectifier circuit is a full-wave rectifier.

16. The LED lamp assembly according to claim 1, wherein, when the safety switch is open, electrical current is prevented from flowing from the first end to the second end of the LED lamp assembly via the rectifier circuits.

17. The LED lamp assembly according to claim 16, wherein the LED lamp assembly conducts an electrical current equal to or less than 0.7 mA between the connector pins arranged at the first end of the LED lamp assembly and the connector pins arranged at the second end of the LED lamp assembly, when a voltage of 500V is applied between the first and second ends of the LED lamp assembly and the safety switch is open.

18. The LED lamp assembly according to claim 16, wherein the safety switch control circuit has a first input electrically coupled to the connector pins at the first end of the LED lamp assembly and a second input electrically coupled to the connector pins at the second end of the LED lamp assembly, wherein the safety switch control circuit has an impedance between the first and second inputs of 10 kOhm or more, measured at a frequency of 10 kHz.

\* \* \* \* \*